(12) United States Patent
Blumofe

(10) Patent No.: US 7,483,945 B2
(45) Date of Patent: Jan. 27, 2009

(54) METHOD OF, AND SYSTEM FOR, WEBCASTING WITH JUST-IN-TIME RESOURCE PROVISIONING, AUTOMATED TELEPHONE SIGNAL ACQUISITION AND STREAMING, AND FULLY-AUTOMATED EVENT ARCHIVAL

(75) Inventor: Robert D. Blumofe, Beverly Hills, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 577 days.

(21) Appl. No.: 10/127,009

(22) Filed: Apr. 19, 2002

(65) Prior Publication Data

US 2004/0193683 A1    Sep. 30, 2004

(51) Int. Cl.
*G06F 15/16* (2006.01)
(52) U.S. Cl. ............... 709/204; 379/201.12; 379/202.01
(58) Field of Classification Search ................. 709/204; 379/202.12, 202.01, 201.12
See application file for complete search history.

(56) References Cited

U.S. PATENT DOCUMENTS

| | | | |
|---|---|---|---|
| 5,559,876 A | 9/1996 | Alperovich | |
| 5,675,511 A | 10/1997 | Prasad et al. | |
| 5,812,652 A * | 9/1998 | Jodoin et al. | 379/205.01 |
| 5,943,321 A | 8/1999 | St-Hilaire et al. | |
| 5,995,608 A | 11/1999 | Detampel, Jr. et al. | |
| 6,138,144 A | 10/2000 | DeSimone et al. | |
| 6,363,411 B1 * | 3/2002 | Dugan et al. | 709/202 |
| 6,418,214 B1 * | 7/2002 | Smythe et al. | 379/202.01 |
| 6,693,661 B1 * | 2/2004 | Vanderwilt et al. | 348/14.01 |
| 6,961,416 B1 * | 11/2005 | Summers et al. | 379/202.01 |
| 2002/0118808 A1 * | 8/2002 | Kelleher et al. | 379/202.01 |
| 2004/0032424 A1 * | 2/2004 | Florschuetz | 345/748 |
| 2005/0144165 A1 * | 6/2005 | Hafizullah et al. | 707/6 |

OTHER PUBLICATIONS

Bernard Cousin, Differential Hashing Functions: Application to Reachability Graph Generation, 1993, Campus universitaire de Beaulieu, IEEE, pp. 190-194.*

* cited by examiner

*Primary Examiner*—Tonia L Dollinger
*Assistant Examiner*—Asghar Bilgrami
(74) *Attorney, Agent, or Firm*—David H. Judson

(57) ABSTRACT

The present invention implements a multimedia business communications platform that enables conference casting over a network. End users or so-called "audience members" participate in conference casts from anywhere on the Internet or behind an enterprise firewall using a standard Web browser running a streaming media player. The conference platform typically includes a number of subsystems: a Web reservation subsystem, a voice server subsystem, a content storage subsystem, a monitoring data subsystem, an attendee access subsystem, and an archive subsystem. Web reservation subsystem provides a mechanism that enables an entity to make an event reservation. Web reservation subsystem typically includes a database and an associated database management system. Voice server subsystem validates a user and converts an incoming telephone signal (i.e., the conference call) to an output data stream. Attendee access subsystem responds to attendee requests and returns information (e.g., a data structure such as a stream metafile) that directs an attendee's streaming media player on how to join the conference cast. Content storage subsystem is used to manage event information and, under the control of the archive subsystem, to archive the event files. The monitoring data subsystem comprises a set of monitoring agents distributed throughout the network. Using these components, the system implements just-in-time resource provisioning, automated signal acquisition and streaming, and automated archiving upon event completion.

35 Claims, 5 Drawing Sheets

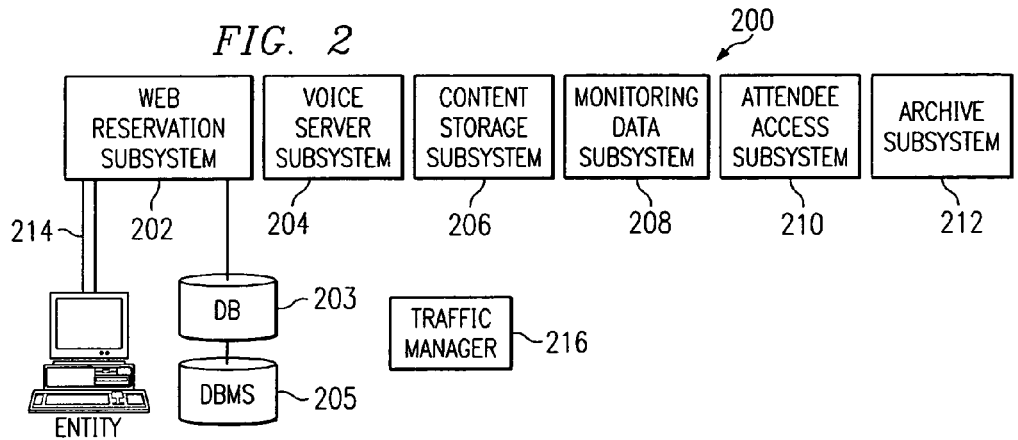
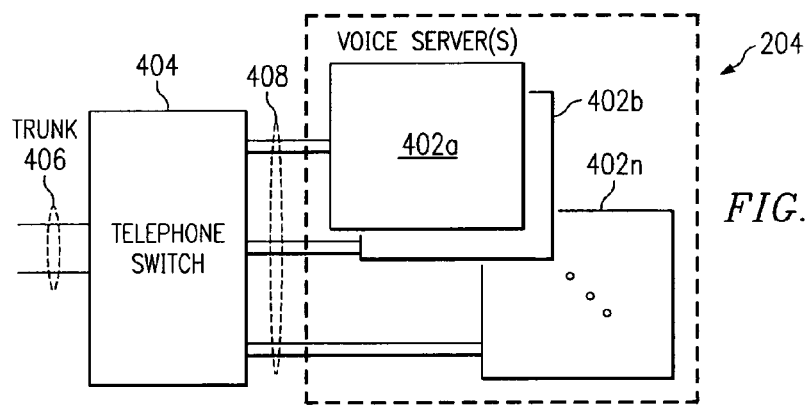
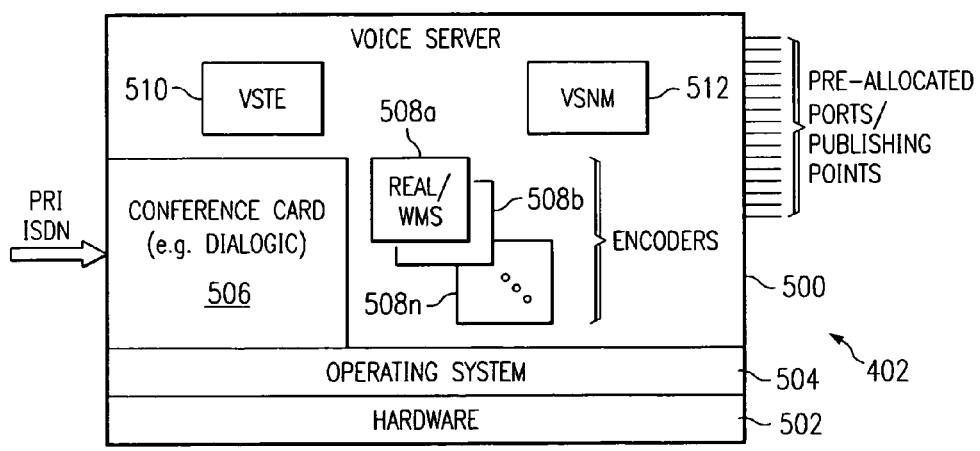

METHOD OF, AND SYSTEM FOR, WEBCASTING WITH JUST-IN-TIME RESOURCE PROVISIONING, AUTOMATED TELEPHONE SIGNAL ACQUISITION AND STREAMING, AND FULLY-AUTOMATED EVENT ARCHIVAL

BACKGROUND OF THE INVENTION

1. Technical Field

The present invention relates generally to network-based conference calling whereby audience members access audio conference calls over computer networks, e.g., using computers running a Web browser provisioned with a streaming media player.

2. Description of the Related Art

It is known in the prior art to provide a multimedia business communications platform that transforms audio and video conferencing into interactive conference casts with integrated streaming audio and video. End-users participate in conference casts from anywhere on the Internet using just a standard web browser, with the call being "streamed" to the participant. Streaming media, as is known, is a type of Internet content that has the important characteristic of being able to be played while still in the process of being downloaded. A client machine can play the first packet of an audio or video stream, decompress the second, while receiving the third. Thus, an end user can start hearing/seeing the multimedia without waiting until the end of transmission. Streaming media quality varies widely according to the type of media being delivered, the speed of the user's Internet connection, network conditions, the bit rate at which the content is encoded, and the format used. Non-streaming content is standards-based in the sense that the server and client software developed by different vendors, such as Apache server, Microsoft Internet Explorer, Netscape Navigator, and the like, generally work well together. Streaming media, however, usually relies on proprietary server and client software. The server, client, production and encoding tools developed by a streaming software vendor are collectively referred to as a format. Streaming media encoded in a particular format must be served by that format's media server and replayed by that format's client. Streaming media clients are often called players, and typically they exist as plug-ins to Web browsers. The most common streaming formats are Windows Media (WMS), Real and Apple QuickTime.

A conference call event typically is set up as illustrated in FIG. 1 and as described below. A host 100 contacts a service bureau 102 to schedule a conference event. The service bureau typically operates an event registration system 104. At step (1), the host 100 calls a Web reservation specialist. At step (2), the reservation specialist creates a customer account if one does not already exist and schedules a conference event. At step (3), the specialist enters the event information into the event registration system 104. Then, at step (4), the specialist confirms the information and sends the host 100 the following: audience Web site address, host Web site address, an event identifier and a user name and password. At step (5), the host 100 enters the host Web site address and obtains a host login page. The host enters the event identifier, user name (if required) and password (if required) provided by the reservation specialist at the service bureau. At step (6), the host 100 accesses an administration page. From there, he or she can carry out a number of provisioning and management tasks such as: provisioning and sending invitations to the audience members, monitoring the event, accessing an archive of the event if available, editing the archive, accessing usage reports, accessing event information, and editing event information. At step (7), the host sends the invitations to the audience members. The message typically includes the event identifier, as well as a link to an audience Web site. At step (8), the prospective audience members receive the notification from the host. To access the event, an audience member clicks on the link (or enters a URL manually) to launch his or her browser's media player to the audience Web site. To connect to an event, an end user audience member needs to have a computer with a video card (standard in all computers), sound card and Internet connection, an Internet browser (Internet Explorer or Netscape Navigator, or the like), streaming media player (e.g., Windows Media Player, RealPlayer or the like) and the Web site address of the event. From the audience Web siste, the audience member enters the eventID, user name (if required) and password (if required) to access the event. Of course, one or more of the above-described steps can be carried out automatically and/or in an online manner.

Traditional Internet conferencing casting systems have several deficiencies. These applications typically use databases to generate reservation information, to initiate events, and to authenticate a host or the attendees. The database dependency creates a potential single point of failure because if the database is unavailable, events cannot be run. Likewise, a typical application runs the event streams from a single server, which again represents a single point of failure and limits scalability, i.e., the number of attendees that can attend the conference. Moreover, the prior art systems require advanced setup for the streams, which dictates a blackout period between the time that an event is reserved and the occurrence of the event itself. Thus, once an event is scheduled, a service provider typically must provision or allocate in advance various system and other resources. Such resources include, without limitation, media encoders, storage, network connectivity, streaming server ports or publishing points, and the like. This is in addition to the human resources required to handle reservations and to provide administrative functions. As a consequence, prior art conference casting systems do not have the capability of reserving and then immediately executing the event, with the resulting stream being immediately available to an audience member. In prior art systems, stream redundancy typically requires special handling and raises costs. Prior art conference casting systems also do not have the capability to archive the event in an automated manner and/or to manage when particular streams get interrupted before the event is terminated.

These and other problems of the prior art are addressed by the present invention.

BRIEF SUMMARY OF THE INVENTION

The present invention implements a system for network-based conference calling that provides a comprehensive set of functionality for interactive communication services and is designed for maximum scalability and reliability. The system provides "just-in-time" or on-demand resource provisioning and automated telephone signal acquisition and streaming. An entity makes a reservation for an event and receives an event identifier and an access code or PIN. Information about the event (such as desired stream format, archive time period, and the like) preferably is stored on a content storage subsystem and also asynchronously in a traditional relational database. When a user (the host or an entity acting on the host's behalf) then initiates a call (or dual calls for redundancy) by entering a telephone number, the call is routed to an available voice center and automatically streamed in one or more stream formats, preferably over a content delivery network. A voice server validates the event PIN preferably without access to the content storage subsystem or the database. The late binding of the call to an available resource, and the ability of the voice server to validate an event PIN without use of any external subsystems, provides for a highly reliable and scalable system. The audience members are provided with a link (an attendee URL) that preferably self contains all the necessary information to give access to the stream, again without reliance on the content storage subsystem or database. The audience members use their web browsers and associated media players to listen to the stream live. After the call is disconnected, an archive is generated from the data stream file copies that were uploaded from the voice server(s) to the content storage subsystem during the call. The archive preferably is made available for audience members for a length of time specified at reservation time.

The conference call system of the invention does not require pre-provisioning of physical resources. Rather, substantially all resources are automatically bound to the event upon user call-in. These resources include the data center, voice server and the encoder. This "just-in-time" or on-demand allocation of audio resources enables the system to become more fault-tolerant. If any resource or asset fails prior to signal acquisition, that equipment is removed from an available resource pool. This allows the system to choose among assets that are available and in working order. To ensure that the state of these assets is correct, the system implements automatic monitoring and testing of resource assets. A dial-in results in the conference using only resources that are working, thus maximizing fault tolerance. After a user logs in and is connected to a voice server, the system also does not rely on a database to authenticate access and initiate the event. The database interface of the system preferably is asynchronous, such that if the database is unavailable at the time a request for an event reservation is made, the reservation completes as required. Later, the database is updated with the reservation information for reporting purposes. The event can be executed even if the database has not yet been updated or is unavailable.

In one particular embodiment, the present invention implements a multimedia business communications platform that enables conference casting over a network. End users or so-called "audience members" participate in conference casts from anywhere on the Internet or behind an enterprise firewall using a standard Web browser running a streaming media player. The conference platform typically includes a number of subsystems: a Web reservation subsystem, a voice server subsystem, a content storage subsystem, a monitoring data subsystem, an attendee access subsystem, and an archive subsystem. Web reservation subsystem provides a mechanism that enables an entity to make an event reservation. Web reservation subsystem typically includes a database and an associated database management system. Voice server subsystem validates a user and converts an incoming telephone signal (i.e., the conference call) to an output data stream. Attendee access subsystem responds to attendee requests and returns information (e.g., a data structure such as a stream metafile) that directs an attendee's streaming media player on how to join the conference cast. Content storage subsystem is used to manage event information and, under the control of the archive subsystem, to archive the event files. The monitoring data subsystem comprises a set of monitoring agents distributed throughout the network. By leveraging these components, the system implements just-in-time resource provisioning, automated signal acquisition and streaming, and automated archiving upon event completion.

The foregoing has outlined some of the more pertinent objects and features of the present invention. These objects should be construed to be merely illustrative of some of the more prominent features and applications of the invention.

BRIEF DESCRIPTION OF THE DRAWINGS

For a more complete understanding of the present invention and the advantages thereof, reference should be made to the following Detailed Description taken in connection with the accompanying drawings, in which:

FIG. 2 is a block diagram illustrating the various functional subsystems that comprise the conference system of the present invention;

FIG. 4 is a block diagram of an illustrative voice server subsystem of the present invention;

FIG. 5 is a block diagram of an illustrative voice server;

DETAILED DESCRIPTION OF THE PREFERRED EMBODIMENT

Figure 1:
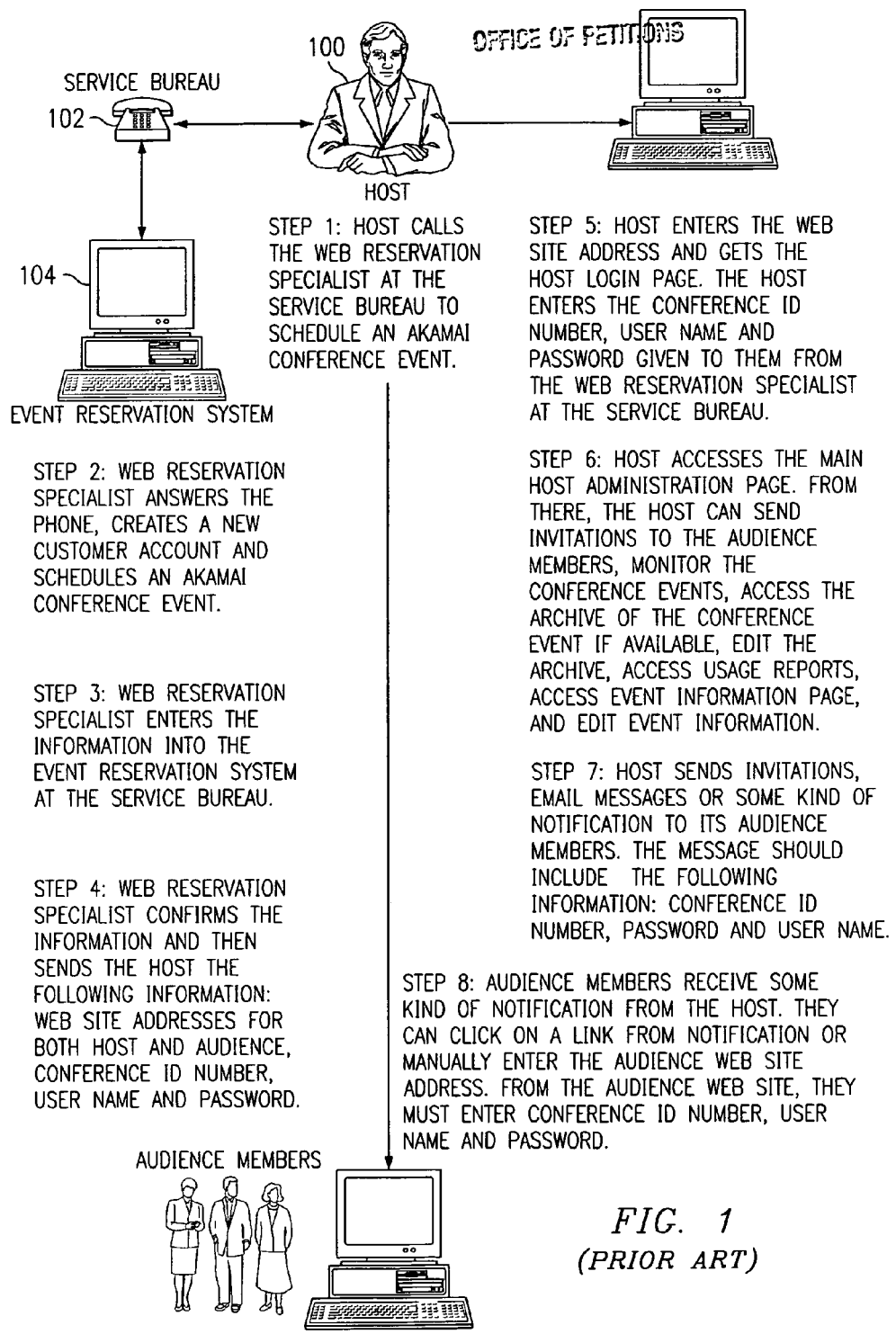
FIG. 1 is a conference casting system of the prior art illustrating how a host makes an Internet audio conference reservation.

The present invention implements a multimedia business communications platform that enables conference casting over a network including, without limitation, the publicly-routable Internet, a corporate intranet, a private network, or any combination thereof. End users or so-called "audience members" participate in conference casts from anywhere on the Internet or behind an enterprise firewall using a standard Web browser running a streaming media player. The conference platform described herein enables the rapid deployment of services that can be easily integrated into any web application. As seen in FIG. 2, the platform 200 provides and/or interfaces with a number of subsystems: a Web reservation subsystem 202, a voice server subsystem 204, a content storage subsystem 206, a monitoring data subsystem 208, an attendee access subsystem 210, and an archive subsystem 212. Typically, each subsystem is implemented as computer software, or a combination of software executing on computer hardware. Web reservation subsystem 202 provides a mechanism that enables an entity 212 to make an event reservation, typically by connecting to the Web reservation subsystem 202, preferably over a secure link 214 such as HTTPS, a VPN, or the like. Web reservation subsystem 202 typically includes a database 203 and an associated database management system 205 (e.g., Oracle, IBM DB/2, or the like) for managing and updating of reservation data. Voice server subsystem 204 validates a user and converts the incoming telephone signal (i.e., the conference call) to an output data stream. Attendee access subsystem 210 responds to attendee requests and returns information (e.g., a data structure such as a stream metafile) that directs an attendee's streaming media player on how to join the conference cast. Content storage subsystem 208 is used to manage event information and, under the control of the archive subsystem 212, to archive the event files. The monitoring data subsystem preferably comprises monitoring agents implemented in software executing on machines distributed throughout the network. As described below, each voice server subsystem (and there may be multiple ones) have a set of voice servers, as will be described in more detail below. The monitoring agents collect data from the servers in the voice server subsystem(s) and, in particular, data about what streams are active and at what ports or publishing points.

Entity 212 typically accesses the Web reservation subsystem 202 by opening a Web browser to a given URL, which, by way of example only, is illustrated as https://web.servicebureau.net/make_reservation.jsp. Preferably, the Web reservation, attendee access and archive subsystems are available at a mirrored site. In such case, a traffic manager 216 is used to direct the entity to an optimally located (e.g., in terms of load, network traffic and/or latency) subsystem. Traffic management products and services are known in the art. An illustrative system is known commercially as FirstPoint$^{SM}$ and is available from Akamai Technologies of Cambridge, Mass. The FirstPoint technique is described in commonly owned, co-pending application Ser. No. 09/866,897, filed May 29, 2001, titled Global Load Balancing Across Mirrored Data Centers. Other commercially available global routing products include Cisco Global Director, global load balancers from F5, and the like. Any product/system/managed service that has the ability to direct a client request to one of a set of mirrored sites based on network traffic conditions, server load, and the like, may be used in the present invention to connect an entity to the mirrored subsystem.

Generalizing, the platform 200 typically is a set of computers. A representative machine is a server running commodity (e.g. Pentium-class) hardware, an operating system (e.g., Linux, Windows 2000, or the like), an application runtime environment (e.g., Java), a Web server (e.g., Apache), and a set of processes (e.g., Java servlets, linkable libraries, or the like, depending on platform) that provide the functionality of a given subsystem. Thus, for example, the Web reservation subsystem 202 is implemented as a Java servlet that presents a fill-in form to the entity, receives data input by the entity, and creates an event reservation for an Internet conference cast event. Web reservation data is stored in database 203 under the control of the database management system 205.

Figure 3:
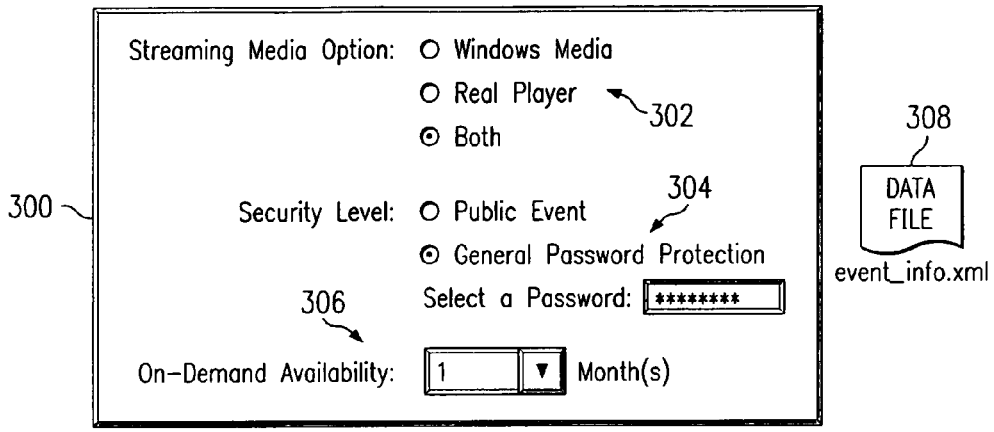
FIG. 3 is an illustrative fill-in form used by the Web reservation subsystem to create a conference event reservation.

FIG. 3 illustrates a representative fill-in form 300 that is presented to the reserving entity (a "reservationist"), preferably online via a Web browser. The form 300 guides the entity to identify the streaming media format 302 (e.g., Real, Windows Media, Quicktime), a security level 304, and to provide an on-demand availability designation 306, the latter information being selected from a listbox identifying how long the event should be archived. The entity fills in the form, perhaps in an automated manner. The reservation subsystem (e.g., a servlet) generates a unique event ID, an access code or PIN, and an attendee Web site address (an "attendee URL"), which information is then stored in a data file 308. Preferably, the data file is in XML format and has an appropriate identifier, e.g., event_info.xml. The event_info.xml data file preferably comprises given information including, without limitation, event title, format, time, eventID, PIN, attendee URL, status (e.g., reserved, completed, or the like). As noted above, the PIN is an access code that is used by a conference host to initiate (or restart) the conference. Typically, the conference host is a service bureau employee, a person running the conference, or, more generally, any other person, process or automated routine.

In a representative embodiment, the Web reservation subsystem 202 instantiates a process (e.g., a servlet) for each event reservation. This servlet generates the event_info.xml file and returns given information to the entity requesting the event. In particular, preferably the servlet returns to the entity a data file comprising an eventID, a host access code or PIN, and an attendee URL. Thereafter, the entity forwards the attendee URL to each prospective attendee, e.g., by e-mail, by publishing the attendee URL in an identifiable location, by syndicating the information to other web sites that provide notification, and the like. A representative attendee URL may be of the following, illustrative only, format:

https://web.servicebureau.net/
meta?event=<eventID>&format=<name>.

As can be seen, preferably the attendee URL has enough embedded information about the event to enable the attendee to attend an event, even (as will be described) if the content storage subsystem is unavailable. As will be described below, when an attendee (i.e., an entity that desires to attend the event) activates this URL, the attendee's streaming media player will be directed to a given URL generated by the attendee access subsystem 210. In addition to forwarding the data file to the reserving entity, the servlet forwards the event_info.xml file to the content storage subsystem 204 and to the database management system 205. The event_info.xml data file preferably comprises given information including, without limitation, event title, format, time, eventID, PIN, attendee URL, and status (e.g., reserved, completed, or the like). Content storage subsystem 204 preferably also is mirrored, in which case traffic manager 216 is again used to determine which content storage subsystem should handle the request. When the event_info.xml file is received at the content storage subsystem 204, the subsystem provisions a directory named by the eventID. The event_info.xml file and event archive files (described below) are stored in the <eventID> directory. Setting up this directory in the content storage subsystem is the only resource allocation required at the time of the event reservation.

A significant technical advantage of the system is that pre-provisioning of physical resources is not required and that substantially all resources are bound to the event upon user call-in as opposed to during the reservation process itself. These physical resources, as will be described, include the data center at which the voice server subsystem is hosted, the voice servers in the subsystems, the encoders running on a given voice server, and the like. In particular, unlike the prior art, the inventive system does not require that physical resources be reserved ahead of time. An event can be reserved and then executed immediately thereafter (provided the attendee URL is disseminated), and all physical resources are then allocated to the event in a "just-in-time" (JIT), on-demand fashion. Unlike the prior art, an entity (e.g., a person, an automated process, or the like) making a reservation may reserve an event for any time, as long as the scheduled time is not in the past. Preferably, any "scheduled" time for the event is not enforced, but rather it is used only as a guideline. In addition, preferably there are no restrictions on how "late" the event is conducted.

A voice server subsystem 206 preferably is accessible from multiple data center locations. According to a technical advantage of the invention, telephone signal acquisition occurs in an "automated" manner in that the system does not need to pre-provision resources with respect to a given event. In a representative embodiment, audio signal acquisition is accomplished through any number of well-known mechanisms. Thus, for example, an 800 number system having advanced routing features may be used to route the call to one of a set of geographically dispersed data centers. Such routing capabilities are known in the art. In such case, a single "800" telephone number would be used for all voice server subsystems and all voice servers in the system. Alternatively, a single dedicated telephone number may be used for each voice server subsystem, e.g., an 1-858-xxx-yyyy number for a data center (and the associated voice server subsystem) located in San Diego and an 1-408-xxx-yyyy number for a data center (and its associated voice server subsystem) located in Philadelphia. In the latter case, the single telephone number represents all of the voice servers at the particular voice server subsystem data center location. Two or more separate telephone numbers are useful in the system where it is desired to provide a conference bridge for the call, so that multiple parties can be involved. A bridged conference call would thus be processed in two voice server subsystems, thus creating multiple (i.e., redundant) streams for the conference. This is often advantageous during the archiving process as will be seen below.

Generalizing, preferably data centers are geographically diverse to guard against natural disaster, and each data center hosts a voice server subsystem 206. As illustrated in FIG. 4, a representative voice server subsystem 400 comprises a set of one or more voice servers 402a-n that are connected to a front-end telephone switch 404 (e.g., AT&T 5ESS, Nortel DMS 100, or the like). A trunk 406 interfaces to the switch 404, and each voice server 402 is connected to the switch over an connection such as ISDN Primary Rate Interface (PRI) line 408. Each ISDN PRI line 408 (and, thus, each voice server) handles up to twenty-three (23) calls in a representative embodiment. Preferably, the data centers use different network service providers to guard against individual provider outages. When a data center is unavailable, an Automatic Routing Feature (ARF) automatically forwards the incoming call to an available data center. The data center is able to handle any audio call generated by an authorized subscriber. As noted above, the data center need not have prior knowledge of the event.

FIG. 5 illustrates a representative voice server 500. As noted above, there are preferably multiple voice servers at each data center. The voice server comprises commodity hardware 502 running an operating system 504 such as Windows 2000 or Linux. An Internet audio conferencing card 506, such as an Intel Dialogic DCB/SC Series card, an Intel Dialogic DM/V-A Series card, or equivalent, is used to interface to the server the incoming audio signal from the user. One or more encoders 508a-n provide format-specific encoding. Thus, a representative server includes a Real encoder, a Windows Media Server (WMS) encoder, and the like. Typically, an encoder is implemented as computer software, i.e., a series of code instructions. Preferably, an encoder process is instantiated for each inbound call that is to be cast. An encoder is disabled (i.e., stopped) and the event archived upon a given condition, e.g., the user going on-hook or entering a given keypad code such as 399. In addition, the server 500 includes one or more applications that are executable on the platform for the purposes to be described below. These applications include a voice server telephony engine (VSTE) 510, and a voice server network manager (VSNM) 512. These modules can be separate or combined. The VSTE 510 performs a number of functions including: handling call control and signaling (e.g., per the Q.931 standard), providing an interface to the conferencing card 506 firmware, playing voice response files requesting eventID and PIN, decoding dualtone multi-frequency (DTMF) responses from the user's telephone keypad, recording digital audio files, publishing monitoring data tables as will be described, and generating event logs.

Figure 6:
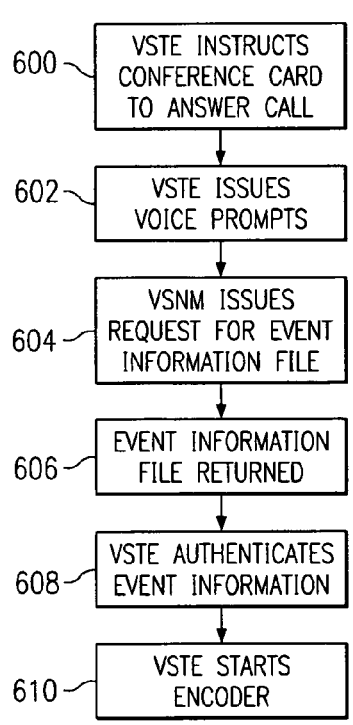
FIG. 6 is a simplified flowchart of the operation of the voice server upon initiation of a conference call.

FIG. 6 is a simplified flowchart of the operation of the voice server upon initiation of a call. In particular, it is assumed that the event has been reserved using the Web-based reservation subsystem and that the incoming call has been directed to a given voice server in the data center. At step 600, the VSTE instructs the conferencing card to answer the incoming call. At step 602, the VSTE issues voices prompts requesting the user to enter the eventID and PIN. To authenticate this information, the VSTE transfers control to the VSNM, which, at step 604, issues a request, e.g., via HTTP, to the content storage subsystem to fetch the event_info.xml file for the event. At step 606, the event_info.xml file is returned to the VSTE. The routine then continues at step 608 wherein the VSTE authenticates the event information, e.g., by evaluating the status flag to ensure that the event is not already over, and by verifying that the PIN returned in the event_info.xml file matches the PIN entered via DJMF by the user in response to the voice prompts. If the event information is authenticated, the VSTE then continues at step 610 to instantiate the proper encoder (identified by the format flag) to begin audio streaming of the event. This completes the process.

According to a technical advantage of this invention, audio casting begins whether or not the VSTE can establish a connection to the content storage subsystem and/or is able to receive or authenticate given information in the event_info.xml file. In particular, preferably the PIN itself is self-checking and can be regenerated "on-the-fly" by the VSTE if the PIN in the event_info.xml file is unavailable for any reason. A convenient technique to accomplish this is to generate the PIN (in the first instance) as a one-way hash of the eventID (or some other identifier) and a shared secret. As long as the VSTE knows or can obtain the shared secret, it can regenerate the PIN and compare it to the code entered by the user (e.g., via DTMF). Thus, there is no delay in initiating the event if event_info.xml is not available to the VSTE in the server.

As is well-known, streaming media delivery requires that a stream have a given name. Typically, the stream name corresponds to some resource over which the stream is output. Conventionally, a resource is usually a "port," a "publishing point," or the stream is merely associated with some unique name. In a representative embodiment, it is assumed that the voice servers output streams on ports. This is not a limitation of the invention, however. In this embodiment, another technical advantage is provided by allocating or "pre-assigning" ports to each voice server in the data center. Thus, for example, a first server in the data center is allocated ports 10,000-10,049, a second server is allocated ports 10,050-10,099, and so on. Preferably, the ports are allocated during set-up of the voice servers in the data center. The above port numbers are merely representative. By pre-allocating ports on each voice server, there is no need for a particular server that will serve the stream to perform a database lookup to obtain a port number. As a consequence, normal processing delays required for that operation are avoided. Pre-allocation can also be used where publishing points, unique names or other delivery techniques are applied to the server streams. For the sake of illustration only, a port-based solution is described below.

Figure 7:
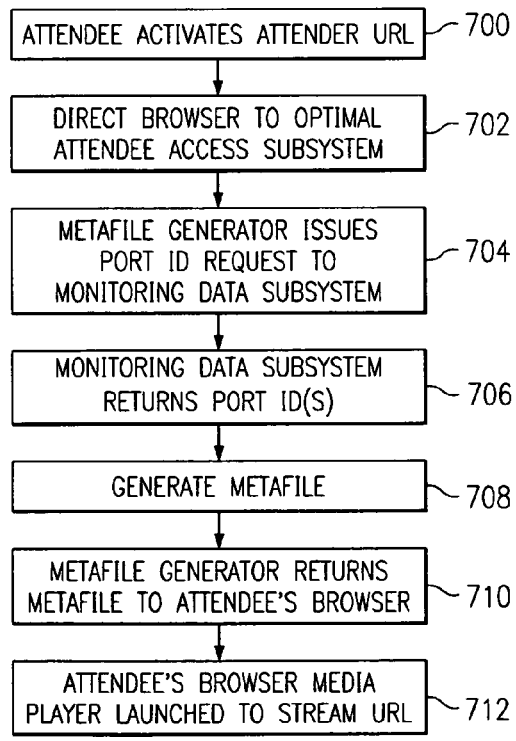
FIG. 7 is a flowchart illustrating how an audience member joins the conference event.
Figure 8:
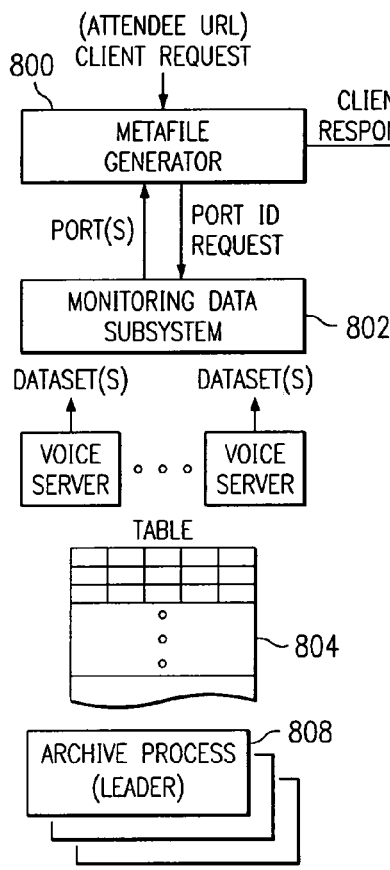
FIG. 8 is a block diagram of the components used to enable an audience member to join the conference event as described in the flowchart of FIG. 7.

It is assumed that the event is now being streamed on one of the pre-assigned ports. FIG. 7 is a flowchart illustrating how an audience member (an "attendee") joins the audiocast. FIG. 8 illustrates various processes that are used to implement this operation. At step 700, the attendee activates (by clicking a link or entering) the attendee URL of the form:

https://web.servicebureau.net/
meta?event=<eventID>&format=<name>.

At step 702, the attendee's browser is directed to a given attendee access subsystem (if more than one is running) using a traffic manager product, system or managed service as described above. With reference now to FIGS. 7 and 8, a metafile generator 800 running in the attendee access subsystem receives the client request and, in response, issues a port identification request to the monitoring data subsystem 802. The metafile generator may be implemented as a servlet, a library, or any other convenient mechanism. This is step 704, and the port identification request typically identifies the eventID and the format. In return, the monitoring data subsystem returns the number of the port on which the event is being streamed. As noted above (where ports are used for streaming), a voice server streams a given call over a given port identified by a port number. Each time a voice server starts an encoder instance, the voice server preferably generates a dataset, e.g., {eventID, format, port #} for the stream being output from the port. As noted above, in certain circumstances (e.g., a bridged conference or if more than one data center is engaged for the event), a redundant call occurs, in which case another voice server will be generating another dataset with the same eventID and format, but with a different port # (as all port numbers are pre-allocated and unique). Each dataset is continuously pushed to the monitoring data subsystem 802, which publishes to the voice servers a table 804 identifying the active events. Thus, at step 706, the monitoring data subsystem 802 returns to the metafile generator 800 an identification of the port(s) (or publishing point(s)) on which the stream(s) (as defined by the eventID and format) are being delivered from the voice server(s). The routine then continues at step 708, with the metafile generator 800 generating a metafile 806. Metafile 806 is a data structure that includes one or more stream Uniform Resource Locators at which the stream is available to the attendee's streaming media player. For each eventID and format pair, there is preferably one URL. The URL is provisioned with the appropriate stream format and other data necessary to enable the attendee's streaming media player to obtain the content. This URL is sometimes referred to as a "stream URL" to distinguish it from the attendee URL. Thus, for example, a representative stream URL is of the following format (assuming a WMS stream made available on a delivery network named "reflector" and port 3012):

mms://...stream.net/<cpcode>/<integritycheckdata>/reflector:3012.

If there are redundant streams, the metafile 806 will include a second stream URL at which the stream can be obtained, e.g., as a fail-over if the stream is unavailable from the other stream URL. As can be seen, metafiles are generated dynamically based on the current state of the event. The system also preferably enables a user to customize a metafile through static and/or dynamic XSL files. At step 710, the metafile generator 800 returns the metafile 806 to the attendee's web browser. At step 712, the attendee's web browser's media player is launched to the stream URL automatically to obtain the stream. If a connection can be established, the attendee is now participating in the conference.

It may be desirable (but not required) to authenticate an attendee prior to returning to the attendee's browser the stream URL. This may be accomplished as follows. When the system generates an attendee URL for a specific event, this URL preferably has the host or attendee's password embedded therein. As a consequence, the system can determine if the correct password is provided without having to do any lookups. A representative URL is the following:

<unsigned part of URL>&...&<signed part of URL>&...&<signature>, where:

<unsigned part of URL>= given information;
<signed part of URL>=
... &org_idxxx&event_id=yyy&event_time=zzz&MD5
(attendee/host_pw,org_id);
<signature>=MD5(<signed part of URL>, secret key).

Note that even though event_time (and probably other information) is included in the URL, this information is only used to facilitate the event if the content storage subsystem (and, thus, the event_info.xml file) is unavailable. The most up-to-date event information preferably is located in the event information file in the storage subsystem. If the MD5 hash value matches the value in the signed portion of the URL, the attendee is authenticated to attend the conference.

One of ordinary skill in the art will appreciate from the above discussion that the inventive conference system provides fully-automated telephone signal acquisition and streaming in addition to the JIT reservation provisioning. The system authenticates the event automatically (even if access to the reservation information in event_info.xml is unavailable), starts up the encoder, and injects the stream into a delivery network as soon as the user begins speaking. Stated another way, all the user has to do is dial the conference system, enter the eventID and PIN, and begin the call. The telephone signal (i.e., the conference call) is immediately available to prospective attendees, who access the call by simply activating the attendee URL that has been provided to them following reservation. In response, the attendee access subsystem returns (to the requesting clients) metafiles that include the stream URL to which the attendee streaming media players are automatically directed.

The conference system of the present invention also provides enhancing archiving capabilities as compared to the prior art. As described above, the archive subsystem preferably operates at different data center locations, in which case a particular archive subsystem is reached through a traffic manager. In an illustrative embodiment, an archive subsystem comprises an archive process 808. When the archive subsystem is mirrored, this process runs on one or more machines. Preferably, each event gets archived when the event is over, which may be indicated directly (with the user entering a given code such 399) or indirectly (when the user disconnects the call and an archive timeout expires). As will be described below, the mere termination of the call connection does not always reflect that the event is actually over although, in the preferred embodiment, the termination of a call does generate an upload (from the voice server to a given content storage subsystem) of a file representing the stream. Thus, typically a given event is captured in more than one stream and, thus, more than one associated file upload to the content storage subsystem. As used herein, archival preferably occurs with respect to the overall event itself and thus typically involves processing (e.g., aggregation, partial substitution, or the like) of the upload files representing the event.

In a distributed system, there are typically several archive processes running at the same time. One archive process preferably is elected as a so-called "leader." The archive process gets required information from the monitoring data subsystem and examines the stream history information. Any convenient leader election protocol may be used. Thus, for example, a given archive process announces a subscription list to all other archive processes and listen for the lists from other processes. The process then merges together the lists received from the other archive processes and elects a leader by the following: sort the list of responses by IP address, remove any machines that have not been heard from over a given period (e.g., 20 seconds), select a given machine as the leader, and notify the other machines.

Figure 9:
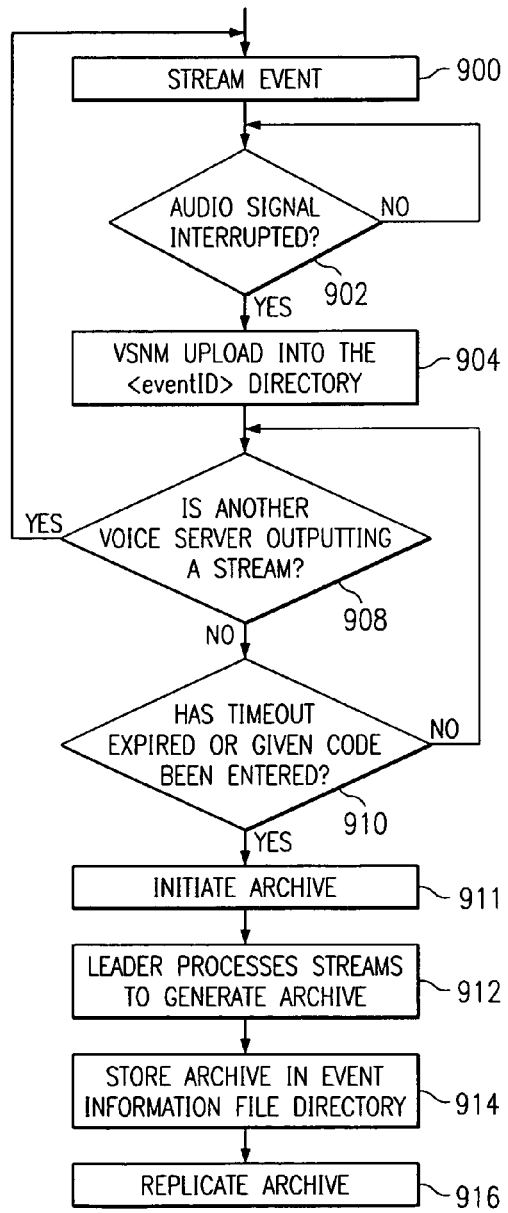
FIG. 9 is a flowchart illustrating an automated archiving function according to the present invention.

FIG. 9 is a flowchart illustrating a preferred archival operation. The routine assumes that an event is in process. This implies that one or more voice servers are outputting streams. At step 900, as the event is streamed, an encoder for a voice server that is actively streaming the event writes the stream to its local disk. At step 902, a determination is made if the audio signal being processed by the voice server has been interrupted. If not, the routine cycles. If, however, the audio signal being processed by the voice server has been interrupted, the process continues at step 904 with the VSNM performing an upload (preferably by FTP) into the <eventID> directory on the content storage subsystem. If the <eventID> directory has been mirrored, the traffic manager may be used to select an optimal mirror site for the upload. The file upload, however, does not necessarily mean that the event is over. Thus, a test is performed at step 908 to determine if another voice server is outputting a stream for the event. The leader can determine this from data supplied by the monitoring data subsystem, which identifies which voice server(s) are outputting streams for the event (and on which ports). If another voice server is outputting a stream for the event, the routine returns to step 900. If, however, the outcome of the test at step 908 is negative, a test is performed at step 910 to determine whether a given timeout has expired or the host has entered a given code (e.g., 399). If not, the routine cycles to step 908. If the timeout has expired or the access code entered, the event is considered over and processing continues at step 911 to begin the archival process. In particular, at step 911, the archive leader process edits the event_info.xml file to reflect that the event has ended and to log data about the event. Thus, for example, the archive process alters the status flag, identifies the stream start time, the stream end time, the unique filename(s) provided by the voice server(s) during the FTP upload(s), and the like. At step 912, the archive leader processes stream(s) associated with the event to generate the archive. At step 914, the archive is stored in the event_info.xml directory. At step 916, the archive is replicated to any mirror. Step 916 is optional. This completes the automated archive operation. Once this operation is complete, an end user can point his or her browser to the system and obtain the archive of the event for the period originally specified in the reservation. Preferably, the archive is obtained by having an end user who desires the archive open his or her browser to the attendee URL to obtain the metafile (and the embedded stream URL) in the manner previously described.

The processing of streams in step 912 is now described. As noted above, there are several circumstances in which multiple streams are generated during an event. In one case, the host dials-in to two separate data centers (over two separate telephone numbers) to initiate multiple streams (from two different voice servers) for redundancy. A bridged conference call can create multiple streams from two voice servers. In another common scenario, the user terminates the conference prematurely or inadvertently (e.g., by disconnecting the call). The call is then later restarted over a different stream by a different encoder but with the same eventID and PIN (and, thus, the same event_info.xml file). In all such circumstances, it is desired for the archive subsystem to be able to construct an archive version of the overall event. In some cases (e.g., where a single call is dropped) this requires that multiple streams (perhaps from different data centers) be concatenated together. In other cases (e.g., where there are multiple streams), it may be desirable to use a portion of one stream for one section of the call and a portion of another stream due to quality or other considerations. Thus, in accordance with the present invention, when the archive leader processes the streams in step 912, such processing typically includes the generation of given metadata that identifies which portions of each stream should be played and in what order to create the archive. This metadata is stored in the event_info.xml file during step 914. Preferably, the raw data uploaded from the voice servers is stored unmodified, and the metadata is used during replay of the archive. In this sense, the event_info.xml file stores a "virtual" archive. Thus, e.g., the metadata for a particular call may instruct the end user's media player to play stream 1 "starting at time x and ending at time y," then play stream 2, and so on. The "starting at time x and ending at time y" information is the metadata.

Generalizing, there are many cases where there are multiple streams (with each stream representing an event fragment) for a given event provided to the archive leader process. In the simple case, the archive leader process analyzes the start and end times of the streams and, if appropriate, instructs the streaming media player requesting the archive to merely concatenate the streams together. Where streams overlap in time but come from different voice servers, the archive leader identifies the appropriate stream fragments and stores the associated metadata in the event_info.xml file to control how the multiple streams are played on a requesting streaming media player.

The archival process of the invention preferably occurs in a fully-automated manner. In particular, each event preferably gets archived when the user disconnects the call and an archive timeout expires or the event ends, e.g., by the user entering a given code. There may be several archive processes running at the same time, and typically one archive process is elected as a leader. The archive process gets required information from the monitoring data subsystem and examines the stream history information. All the encoded files from all calls are assumed to be in the content storage subsystem (they are placed there by the voice servers, as described above). The archive leader (if one exists) determines whether one or more of these files make an acceptable archive. As noted above, if there is an acceptable archive, the archive process creates an ordered list of good file names of the files placed in the content storage subsystem and writes that list in the event_info.xml file for that event. As also noted, the list includes metadata about which portions of each stream should be played and in what order to create an optimal archive of the event. If an acceptable archive cannot be determined, the archive process sets up an error flag and stops monitoring the event. If this error flag is later cleared, then the archive process re-tries to archive the event.

The conference call is streamed over a delivery network in a preferred embodiment. As is well known, content delivery networks provide enhanced content delivery network by routing requesting clients to optimal often edge-based content servers which are not overloaded and that are likely to provide access to the content. A representative streaming media content delivery network is FreeFlow Streaming, available from Akamai Technologies, Inc. of Cambridge, Mass. In this technique, the stream is sent on multiple redundant paths to enable a given edge server to construct a clean copy of the stream when some of the network transmission paths are down or lossy. This "reflector" transport network is described in copending application Ser. No. 09/753,398, titled STREAMING MEDIA SUBSCRIPTION MECHANISM FOR A CONTENT DELIVERY NETWORK, filed Jan. 3, 2001.

Figure 10:
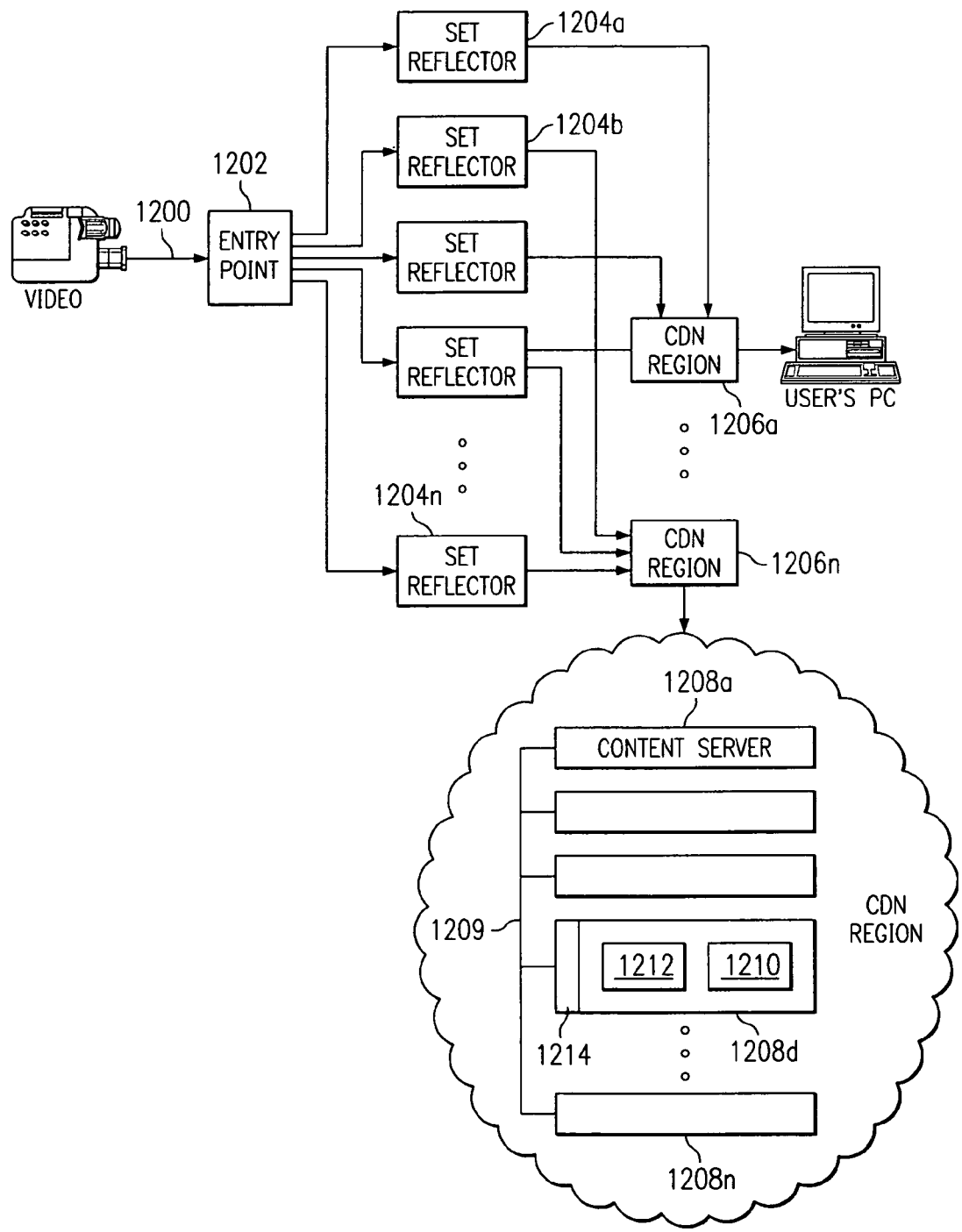
FIG. 10 is a representative stream "reflector" network that may be used to deliver the conference streams.

FIG. 10 is a representative reflector network. In this example, the stream output from the voice server is sent to a content delivery network (CDN) entry point 1202. An entry point, for example, comprises two servers (for redundancy), and each server can handle many streams from multiple voice servers. Once the entry point receives the stream, it rebroadcasts copies of the stream to so-called set reflectors 1204*a-n*. A set reflector is a server. The streams are multiplexed and delivered to the set reflectors preferably via UDP (e.g., WMT encapsulated in RTSP encapsulated in UDP over IP). These set reflectors are preferably diverse from a network and geographic standpoint (e.g., at diverse Internet backbone data centers) to ensure fault tolerance. Each set reflector, in turn, rebroadcasts its copy of the stream to each subscribing region, e.g., region 1206*d*, of a set of regions 1206*a-n*. A subscribing region 1206*d* is a CDN region that contains one or more streaming edge nodes 1208*a-n* to which user(s) have been routed by a CDN request-routing mechanism. In other words, set reflectors send their streams to every edge region where they are needed. A CDN region, in this example, includes a set of edge nodes connected by a common backbone 1209, e.g., a local area network (LAN). Typically, an edge node, e.g., node 1208*d*, comprises a streaming server 1212 and it may include a cache 1210. A representative server runs an Intel processor, the Linux operating system and a Real Media or QuickTime Server. For Windows-based platforms, a representative server runs an Intel processor, Windows NT or 2000, and a Windows Media Server. The edge node may also run a control program 1214 to enable a given edge server to subscribe to a given stream, which will occur when a conference attendee's streaming media player is directed to that edge server. An illustrative request routing mechanism for resolving the stream URL to an optimal edge server for a given attendee is described in U.S. Pat. No. 6,108,703.

The content delivery network illustrated above is merely exemplary. There is no requirement that streams be delivered over this type of reflector topology. In a simple implementation, the streams are output on conventional WMS (or Real, Quicktime, or other format) publishing points and delivered to corresponding WMS (or Real, Quicktime, or other format) streaming servers over any type of network connection (e.g., the Internet, an enterprise-based intranet, a private network, VPN, or the like).

The present invention may be operated as a managed service by a service provider or made available as a standalone system. The system may include an application programming interface (API) over which third parties can send messages (preferably XML) through a secure link (such as HTTPS) to reserve, modify or cancel an event, or to get information about existing events. The system may also include an event manager tool that is implemented as a Web-based extranet application. All native conference events can be monitored through this tool.

The following are additional details for a preferred embodiment of the voice server. Preferably, the VSTE 510 supports B-Channel Availability Signaling (BCAS) between the network switch over which the call is proceeding and the voice server. BCAS provides additional functionality to allow load distribution across multiple voice servers, placing channels out of service when a pool of available ports is low, allowing the voice server to be suspended for maintenance, and providing the ability to monitor PRI signaling or equipment failures. In particular, BCAS provides for initiation and acknowledgement of service requests to place individual channels into one of three states: in service, maintenance, and out-of-service.

The VSTE 510 preferably also provides a so-called "port availability suspend" function. This function removes all available channels from service when a pool of available ports on the voice server is low. This function prevents additional calls from being routed to the voice server when there is a risk that encoder ports will not be available to stream the event. When activated, any channel waiting for a call is placed out-of-service. As each event ends, the channel on which the event was received is placed out-of-service. Port availability suspend is implemented to prevent users from gaining access to unauthorized events. In operation, each user accessing an event stream receives an authentication code, which is preferably valid for an authentication code timeout period. If the user accesses an event nears its end, the authentication code would be valid for the authentication code timeout period, allowing the user to access another event on that port. This is undesirable. For this reason, the port on which the event is streamed is not used again until after a "port reuse timeout period." If the port reuse timeout is equal to or greater than the authentication code timeout period, no user can access an unauthorized event. A voice server preferably is placed in port availability suspend mode when then voice server nears the point of no useable ports being available. When this "low port availability" condition is removed, channels are placed in an "in-service" condition.

The voice server 500 also can be placed in a suspended state for maintenance. In this state, all unused channels are maintained "out-of-service." All busy channels are placed "out-of-service" after the event has been completed. When all events on a suspended voice server are out-of-service, PRI services (to the conferencing cards) are suspended, and communications between the network switch and the voice server are terminated, thereby allowing the network switch to route calls to other voice servers in the data center. The VSTE can also detect failure of d-channel communications and signaling errors.

As described above, each voice server includes one or more PRI-compatible conferencing cards. Although not illustrated, each voice server may be connected to the network switch either through a Channel Service Unit (CSU) or directly to the switch or other termination device supplied by a telecommunications service provider. Preferably, each conferencing card is provisioned with its own d-channel, which enables each voice server to maintain independent operation. Whether a CSU is required depends on the location of the network switch (5ESS, DMS100, or the like) and on the termination equipment at the main point of entry at the data center. If the network switch is co-located with the voice server equipment, a T1 cable can be run between racks and a CSU is not necessary. A CSU is also not required if the network switch is in a remote central office (CO) and termination equipment is available at the data center through which the service provider can provide diagnostic/loopback functions. A CSU may be used when there is no other means of verifying the connection from a remotely located network switch to the data center.

Preferably, the network switch provides the capability for acknowledging service messages sent from the voice server conferencing cards. This feature is called "B-channel Availability Signaling" on the AT&T 5ESS switch. The same feature set is referred to as "Remote Blocking" on the DMS-100 switch. The operation of service message signaling may be as follows: service messages allow the customer termination equipment (in this case, the conferencing card) to place individual bearer channels in and out of service. This functionality enables the port re-use, voice server suspend and load distribution functions. The conferencing card sends a service message on the d-channel to a network switch requesting that a channel be put in or out of service. The switch must then acknowledge the service request. If the request was to put a specific channel out of service, the network switch must acknowledge the service message and then not route any calls to that channel. Preferably, calls are routed to the first available channel that is not out of service. If all channels of a conferencing card are either busy or out of service, the network switch preferably routes calls to the next available card.

In summary, the inventive system does not require that physical resources be reserved ahead of time. An event can be reserved and then executed at any time, and all physical resources preferably are allocated to the event in a "just-in-time" (JIT), on-demand fashion. This provides significant flexibility and reduced costs as compared to prior systems. More specifically, the system of the invention does not pre-provision any audio resources. Rather, substantially all audio resources are bound to the event upon user call-in. These resources include the data center, voice server and the encoder. This "just-in-time" or on-demand allocation of audio resources enables the system to become more fault-tolerant. Any resource or asset that fails, prior to signal acquisition, results in the removal of that equipment from an available resource pool. This allows the system to choose among assets that are available and in working order. To ensure that the state of these assets is correct, the system implements automatic monitoring and testing of resource assets. A dial-in results in the conference using only audio resources that are working, thus maximizing fault tolerance. After the user logs in and is connected to a voice server, the system does not rely on a database to execute the event. The database interface of the system preferably is asynchronous such that if the database is unavailable at the time a request for an event reservation is made, the reservation completes as required. Later, the database is updated with the reservation information.

The archiving process for audio provides a great deal of flexibility that is used to manipulate when an archive is produced, when it is usable by the audience, and how dropped calls are handled. As described, the system automatically archives an event after it has ended or a call back period has expired. An archive is generated when the event is known to be over or after the event the systems has detected that, for some fixed amount of time, no live streams are being generated. Via a web interface or via DTMF (for audio), a host can notify the system that the event is over, and in this case, an archive is generated right away. There will be separate timeouts to determine when an event is over and when an event should be archived. When an event is over, no calls for that event will be accepted at the voice servers. Archive timers preferably are initiated after a customer hangs up or the call drops. Preferably, this timer is set at a given default for all events or can be set on an individual basis. After the timer expires the file is uploaded to storage. Users of the system have their conference event files uploaded to a designated FTP directory. After the upload, the content storage system preferably replicates the content, placing copies of the files on each of multiple storage centers.

When an end-user requests an archived event that is not already cached in the streaming server determined optimal for the end-user, the server fetches a copy of the requested file from the optimal storage center. One technique for accomplishing this is described in copending application Ser. No. 10/113,183, filed Apr. 1, 2002, titled SCALABLE, HIGH PERFORMANCE AND HIGHLY AVAILABLE DISTRIBUTED STORAGE SYSTEM FOR INTERNET CONTENT. Then the streaming server fulfills the user's request and also keeps a copy of the file in its cache so that it can fulfill subsequent similar requests for that content.

The present invention provides a distributed, standards-based software architecture that provides a comprehensive set of functionality for interactive communication services and is designed for maximum scalability and reliability. The platform enables robust event provisioning, signal acquisition, monitoring, archiving, reporting and billing required for base streaming. The inventive functionality in made available from an applications platform rather than a one-size fits-all application. Service providers can provide an integrated and customized product through use of the APIs, and even integrate their own technology as desired. As noted above, a significant advantage of the invention is that it does not require that physical resources be reserved ahead of time. An event can be reserved and then executed right away, and all physical resources are allocated to an event in a "just-in-time," on-demand fashion. The system has no single points of failure, and it is self-healing. That is, no single component failure can bring down an event, and when a component does fail, the system compensates automatically. In addition, the system is able to handle large numbers of simultaneous events and massive total audience sizes. As demand grows, the system can easily be expanded to accommodate the load.

Having described my invention, what I claim is as follows:

1. Apparatus for webcasting over a computer network, comprising:

a first subsystem accessible over the computer network and including code for enabling an entity to reserve a webcast event, to obtain an event identifier, an access code, and an attendee URL, and to initiate storage of an event information file associated with the webcast event, where the webcast event is a web-based audio conference event for casting speech of a speaker to one or more audience members over the computer network;

a second subsystem connectable to a telephone network and including code for enabling the entity to initiate the webcast event, without access to the event information file, by verifying that a value derived from a one-way hash of the event identifier entered by the entity together with a shared secret matches the access code entered by the entity, code for generating a data stream from an audio signal derived from speech of the speaker, wherein the speech of the speaker is receivable by the second subsystem over the telephone network, and code for uploading a copy of the data stream to a storage system upon interruption of the audio signal;

a third subsystem accessible over the computer network and including code responsive to a client browser associated with a listener, who is an audience member, requesting the attendee URL for returning to the client browser a data structure including a stream URL, wherein the stream URL enables a streaming media player to obtain the data stream so that the listener can hear the speaker, who is not an audience member, during the webcast event;

a fourth subsystem accessible over the computer network and including code for generating a directory for the webcast event, and code for storing in the directory the event information file and the copy of the uploaded data stream; and a fifth subsystem accessible over the computer network and including code for creating an archive of the webcast event and for storing the archive in the directory, wherein the attendee URL is useful to obtain access to the archive following the webcast event.

2. The apparatus as described in claim 1 wherein the first subsystem also includes code for enabling the entity to identify a given format for the data stream, and the code for generating the data stream from the audio signal in the second subsystem is an encoder associated with the given format.

3. The apparatus as described in claim 1 wherein the second subsystem comprises a set of one or more servers.

4. The apparatus as described in claim 3 wherein each of the servers includes a telephone control engine for playing voice response files requesting entry by the entity of the event identifier and the access code.

5. The apparatus as described in claim 4 wherein the telephone control engine writes the data stream to a storage disk associated with the voice server during the webcast event.

6. The apparatus as described in claim 5 wherein the telephone control engine uploads the data stream from the storage disk to the storage system when the audio signal is interrupted.

7. The apparatus as described in claim 1 wherein the code for creating an archive associates given metadata with a data stream, wherein the given metadata identifies a given portion of the data stream for use in the archive.

8. The apparatus as described in claim 1 wherein each of the first, second and third subsystems has two or more instances.

9. The apparatus as described in claim 8 further including a traffic manager to select a given instance of the first, second and third subsystems.

10. The apparatus as described in claim 1 wherein the data structure is a metafile, and the metafile includes a one or more stream URLs, wherein each stream URL is associated with a given stream associated with the event.

11. In a webcast system including a Web-based reservation system accessible over a computer network for enabling an entity to reserve a webcast event and to obtain an attendee URL, the improvement comprising:

a set of one or more voice server subsystems each connectable to a telephone network, wherein each voice server subsystem includes a set of one or more voice servers, each voice server having a storage disk associated therewith, a telephone interface for receiving an audio signal, an encoder for generating a data stream from the audio signal derived from speech of an individual speaker, and code (a) for validating a user-entered access code, (b) for verifying that a value derived from a one-way hash of an event identifier entered by the entity together with a shared secret matches the user-entered access code, (c) for writing the data stream to the storage disk, and (d) for initiating an upload of the data stream from the disk to a storage system when the audio signal is interrupted; and a set of one or more attendee access subsystems each connectable to the computer network and including code responsive to a client browser, associated with a listener, who is an audience member, requesting the attendee URL for returning to the client browser a data structure including a stream URL at which a streaming media player associated with the client browser can obtain the data stream so that the listener can hear the speaker, who is not an audience member, during the webcast event;

a set of one or more archive subsystems each connectable to the computer network and including code (a) for creating a directory for the event, (b) for storing in the directory an event information file, (c) for creating an archive of the webcast event; and (d) for storing the archive in the directory for subsequent access using the attendee URL.

12. In the webcast system as described in claim 11 wherein at least two (2) voice server subsystems are active during the webcast event to generate a set of data streams.

13. In the webcast system as described in claim 12 wherein the code for creating an archive of the event in each archive subsystem associates metadata with each of the set of data streams to control how the archive is constructed from the set of data streams.

14. In the webcast system as described in claim 11 further including a global traffic manager for selecting a given attendee access subsystem to respond to a given client browser request.

15. In the webcast system as described in claim 12 wherein the global traffic manager is used to select a given content storage subsystem in which the directory is located.

16. In the webcast system as described in claim 11 wherein each of the voice server subsystems are associated with a given telephone number.

17. In the webcast system as described in claim 11 wherein all of the voice server subsystems are associated with a given telephone number.

18. In the webcast system as described in claim 11 wherein the code for validating the user-entered access code does not require access to any external resource.

19. In the webcast system as described in claim 11 further including a monitoring data subsystem for collecting a dataset associated with each data stream being output from a voice server.

20. In the webcast system as described in claim 19 wherein the dataset includes an event identifier, a streaming media format, and a port or publishing point designation.

21. In the webcast system as described in claim 11 wherein each attendee access subsystem includes code for authenticating whether a user of the client browser is authorized to access the data stream.

22. A method of webcasting, comprising:

reserving a webcast event (a) by providing an entity with an event identifier, access code and attendee URL, (b) by generating an event information file, and (c) creating a directory associated with the webcast event in which the event information file is stored, wherein the webcast event is an audio conference casting event;

initiating the webcast event (a) by verifying, without access to the directory, that a value derived from a one-way hash of the event identifier entered by a host together with a shared secret matches the access code entered by the host; and (b) upon verification, encoding speech data of a speaker into a data stream;

enabling a listener, who is an audience member, to access to the data stream (a) by returning to a client browser launched to the attendee URL a data structure including a stream URL at which the data stream can be obtained so that the listener can hear the speaker, who is not an audience member, during the webcast event; and generating an archive upon completion of the webcast event; and at a later time, having an end user access the archive by opening a client browser to the attendee URL.

23. The method as described in claim 22 further including the steps of:

generating a copy of the data stream as the webcast event proceeds; and automatically uploading the copy to a central store if the speech data is interrupted.

24. The method as described in claim 23 wherein the step of generating the archive includes:
  generating metadata identifying a given portion of the data stream for use in the archive.

25. The method as described in claim 24 further including the steps of:
  modifying the event information file to include the metadata; and
  storing the archive in the directory.

26. The method as described in claim 22 wherein the speech data is encoded into a plurality of data streams.

27. The method as described in claim 26 wherein the step of generating an archive includes generating metadata identifying a given portion of each of the plurality of data streams.

28. The method as described in claim 22 further including:
  restricting access to the archive for a time period specified in the event information file.

29. The method as described in claim 22 further including:
  restricting access to the data stream to an authenticated entity.

30. The method as described in claim 22 wherein completion of the webcast event occurs upon occurrence of a user-initiated event.

31. The method as described in claim 22 wherein completion of the webcast event occurs upon a given timeout following termination of the speech data.

32. A method of webcasting wherein a given webcast event has been reserved by providing a webcast event with an event identifier, access code and attendee URL, comprising:
  initiating the webcast event at one or more locations (a) by verifying that a value derived from a one-way hash of the event identifier entered by a host together with a shared secret matches the access code entered by the host; and
  (b) upon verification, encoding speech data into a data stream, wherein the speech data is derived from speech of a speaker;
  enabling a listener, who is an audience member, access to the data stream (a) by returning to a client browser launched to the attendee URL a data structure including one or more stream URLs at which the data stream can be obtained, wherein the so that the listener can hear the speaker, who is not an audience member, during the webcast event;
  as the webcast event progresses, storing a copy of each data stream in a local data store;
  upon interruption of the speech data, transferring a copy of the stored data stream to a central storage;
  upon completion of the webcast event, automatically generating an archive; and
  at a later time, enabling access to the archive using the attendee URL.

33. The method as described in claim 32 wherein the step of automatically generating an archive includes:
  defining metadata for each data stream copy that defines what portion of each data stream is to be used for the archive; and
  storing the data stream copies and the metadata in a directory of the central store uniquely associated with the event identifier.

34. The method as described in claim 32 further including the step of restricting access to the archive after a given time period has elapsed as determined by information in the event information file.

35. The method as described in claim 32 wherein the data streams are streamed over a content delivery network.

* * * * *